(12) United States Patent
Seidel

(10) Patent No.: US 9,566,955 B2
(45) Date of Patent: Feb. 14, 2017

(54) LENGTH-ADJUSTABLE TELESCOPIC TUBE, SUPPORT JACK AND ASSEMBLY PROCESS

(71) Applicant: Jost-Werke GmbH, Neu-Isenburg (DE)

(72) Inventor: Günter Seidel, Riedstadt (DE)

(73) Assignee: Jost-Werke GmbH, Neu-Isenburg (DE)

( * ) Notice: Subject to any disclaimer, the term of this patent is extended or adjusted under 35 U.S.C. 154(b) by 455 days.

(21) Appl. No.: 13/964,527

(22) Filed: Aug. 12, 2013

(65) Prior Publication Data

US 2014/0048759 A1 Feb. 20, 2014

(30) Foreign Application Priority Data

Aug. 15, 2012 (DE) .................. 10 2012 214 514

(51) Int. Cl.
| | |
|---|---|
| *B60S 9/02* | (2006.01) |
| *B60S 9/04* | (2006.01) |
| *B60D 1/155* | (2006.01) |
| *B60D 1/167* | (2006.01) |
| *B60S 9/08* | (2006.01) |
| *F16B 9/02* | (2006.01) |
| *F16B 7/10* | (2006.01) |

(52) U.S. Cl.
CPC ............ *B60S 9/04* (2013.01); *B60D 1/155* (2013.01); *B60D 1/1675* (2013.01); *B60S 9/08* (2013.01); *F16B 9/026* (2013.01); *F16B 7/10* (2013.01); *Y10T 29/49947* (2015.01); *Y10T 403/32467* (2015.01)

(58) Field of Classification Search
USPC ........................................................ 254/419
See application file for complete search history.

(56) References Cited

U.S. PATENT DOCUMENTS

| | | | | |
|---|---|---|---|---|
| 2,117,562 A | * | 5/1938 | Marsch ................. | B60D 1/155 280/460.1 |
| 3,614,064 A | * | 10/1971 | Bennett ................ | B60S 9/04 254/418 |
| 3,642,242 A | * | 2/1972 | Danekas ................ | B60S 9/02 248/354.4 |
| 3,709,522 A | * | 1/1973 | Olson ................... | B60D 1/155 180/904 |
| 3,863,894 A | * | 2/1975 | Mansi ................... | B60S 9/02 254/420 |
| 4,074,784 A | * | 2/1978 | Lee ...................... | B60K 7/0007 180/24 |
| 4,077,172 A | * | 3/1978 | Johnston ............... | E04G 11/48 249/18 |

(Continued)

FOREIGN PATENT DOCUMENTS

| | | |
|---|---|---|
| DE | 2024095 A1 * | 12/1971 |
| DE | 30 02 613 A1 | 8/1990 |

(Continued)

*Primary Examiner* — Alvin Grant
(74) *Attorney, Agent, or Firm* — Brinks Gilson & Lione

(57) ABSTRACT

A length-adjustable telescopic tube (1) has a longitudinal axis (L), an inner tube (2) and an outer tube (4). In one of the tubes (2, 4) a component (20) is arranged, which features first attachment structures (28*a*, 28*b*). The tube (2, 4) has second attachment structures. Furthermore, at least one plug-in element (50, 60, and 70) with third attachment structures (58, 68, and 78) is provided, which cooperate with the first (28*a*, 28*b*) and second attachment structures (48*a*, 48*b*) to form a form-locking connection with the component (20) in at least one direction along the longitudinal axis (L) or perpendicular to the longitudinal axis.

17 Claims, 17 Drawing Sheets

(56) References Cited

U.S. PATENT DOCUMENTS

| | | | | |
|---|---|---|---|---|
| 4,589,670 A * | 5/1986 | Sweetin | B60D 1/155 | 280/405.1 |
| 5,282,605 A * | 2/1994 | Sauber | B60D 1/66 | 254/420 |
| 5,295,703 A * | 3/1994 | White | B60D 1/66 | 254/418 |
| 6,726,237 B1 * | 4/2004 | Carrico | B60D 1/06 | 280/482 |
| 7,163,207 B2 * | 1/2007 | Baird | B60P 1/56 | 254/419 |
| 7,398,959 B2 * | 7/2008 | VanDenberg | B60S 9/08 | 254/2 R |
| 7,425,015 B1 * | 9/2008 | Schipman | B60D 1/66 | 280/400 |
| 2005/0035260 A1 * | 2/2005 | Franzen | B60S 9/02 | 248/351 |
| 2008/0197332 A1 * | 8/2008 | Siedel | B60S 9/08 | 254/424 |
| 2008/0224113 A1 * | 9/2008 | Muller | B65D 90/14 | 254/419 |
| 2009/0090896 A1 * | 4/2009 | Muller | B60S 9/08 | 254/419 |
| 2009/0152855 A1 * | 6/2009 | Muller | B60S 9/02 | 280/766.1 |
| 2010/0072737 A1 * | 3/2010 | Alguera | B60S 9/04 | 280/763.1 |

FOREIGN PATENT DOCUMENTS

| | | |
|---|---|---|
| DE | 3938024 A1 | 5/1991 |
| DE | 102005034554 A1 | 2/2007 |
| EP | 1332936 A2 | 8/2003 |
| EP | 1 104 369 B2 | 3/2007 |
| GB | 1301879 A | 1/1973 |

* cited by examiner

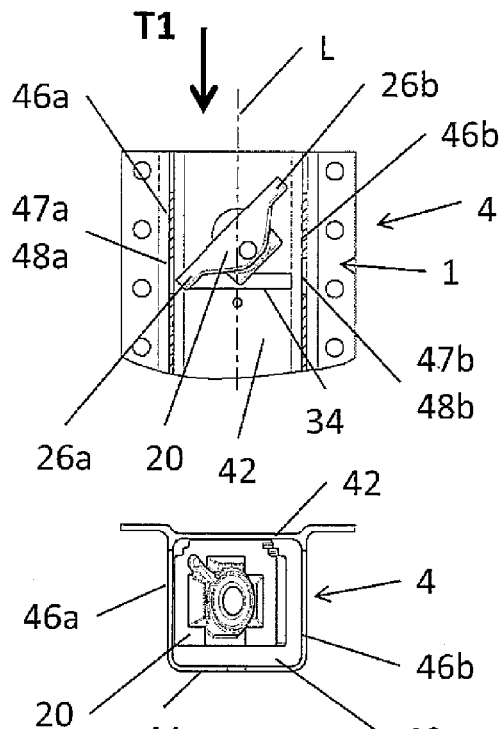
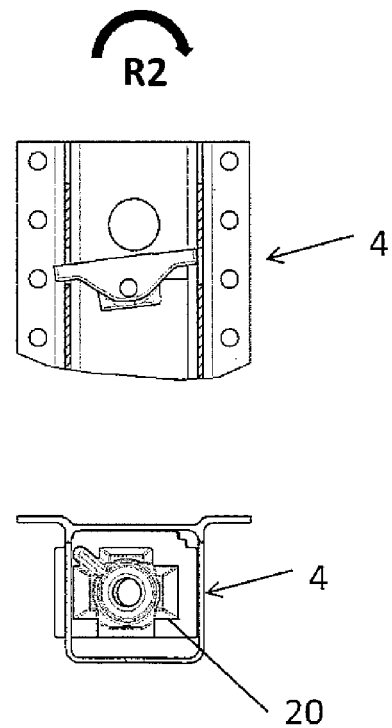
Fig. 3
Fig. 4
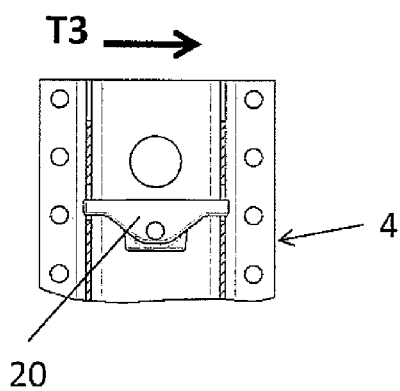
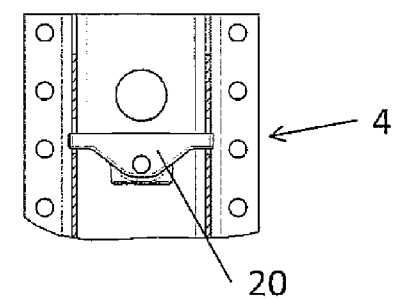
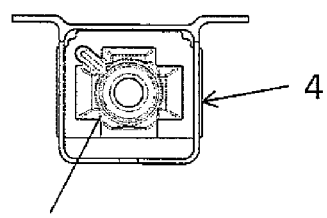
Fig. 5
Fig. 6

LENGTH-ADJUSTABLE TELESCOPIC TUBE, SUPPORT JACK AND ASSEMBLY PROCESS

CROSS-REFERENCE TO RELATED APPLICATIONS

This application claims the priority of German application DE1020122145141.1, filed on Aug. 15, 2012.

TECHNICAL FIELD

The invention generally relates to a length-adjustable telescopic tube. The invention also relates to a support jack comprising such a telescopic tube and the assembly process for at least one component on a tube of such a telescopic tube.

BACKGROUND OF THE INVENTION

Length-adjustable telescopic tubes comprising an outer and an inner tube are used in support structures, in particular axle trailer or semi-trailer devices.

Such devices are known, for instance, from EP 1 104 369 B2. In this known device, a component that forms the common bearing block for the spindle and the transmission input shaft is connected on three sides to a tube of a telescopic tube unit, wherein the fourth side is arranged at a distance to the last wall of the tube. This makes it possible to achieve a particularly compact design of the supporting device since part of or the entire transmission may be accommodated for driving the spindle within the tube. Such support devices in general are made entirely of steel and mounted via a material bond by welding the component carried on the three sides. The embodiment of the component in steel allows rigid and stable support of the forces occurring during operation in compact dimensions.

At the same time, the material has sufficient strength for direct mounting of the spindle and the transmission input shaft, and so additional bushings made of another material are not necessary.

To reduce the weight of such devices, a telescopic supporting device is proposed in DE 39 02 613 A1, where the inner and outer tubes are made of aluminum, aluminum alloy or plastic. To achieve the necessary rigidity, these tubes have longitudinal ribs.

Components, such as the spindle nut or the printing plate which are generally made of steel, must be connected to the tubes made of these same materials. A direct materially bonding connection of such these components to such a tube is only possible by gluing or soldering due to the different materials. Because of the low strength values achievable and the complexity of the processes, the processes are ruled out for telescopic tubes, which find particular use in support jacks. Other fasteners require stamping or pinning of the components for connection. In all cases, an exchange of the components requires the exchange of the respective tube.

SUMMARY OF THE INVENTION

It is therefore an object of the present invention to provide a length-adjustable telescopic tube, wherein components can be simply attached to a tube of the telescopic tube.

This object is achieved by a length-adjustable telescopic tube with the component has first attachment structures and the tube has second attachment structures, that at least one plug-in element is provided with third attachment structures that cooperate with the first and second attachment structures for a form-locking fixation of the component, and that the component is connected in at least one of a force-locking and a material-bonding manner to the tube.

The first attachment structures are preferably insertable into the second attachment structures. The third attachment structures preferably cooperate with the first and second attachment structures to form a form-locking fixation in the direction of the longitudinal axis L of the telescopic tube and/or perpendicular to the longitudinal axis L.

The first, second, and third attachment structures form a plug-in system that offers a plurality of advantages.

The assembly is simplified because a complicated welding of component and tube is not required and the component can be fixed in a form-locking manner via the plug-in elements in the tube. Only the plug-in elements are force-locked or materially bonded to connect to the tube in order to provide the required stability for the arrangement. Since the plug elements are preferably plugged in from the outside, they can be easily attached to the tube.

A further advantage is that the materials of the tube and the component may be different so that also lightweight materials can be connected, for example with steel.

Preferably the component is arranged completely or partly within the tube.

One particular embodiment provides that the tube is the outer tube and that the component is a pressure-loaded component. This component can be a bearing block or pressure plate of, for example, a support jack.

The component preferably comprises the first attachment structures on two opposite sides. The first attachment structures are designed such that the dimensions of the component at these positions are greater than the distances of the side walls of the tube, in which the corresponding second attachment structures are arranged, into which the first attachment structures are introduced. This has the advantage that the forces acting during operation from the component can be channeled parallel to the longitudinal axis into the tube and the respective side wall of the tube.

Preferably the tube and the component are made of different materials. In this case, it is important that the component is, made, for example of steel for stability reasons, while the tube or the telescopic tube can be made of a different material, such as aluminum, aluminum alloy, titanium alloy or plastic.

Weight reductions in telescopic tubes can thereby be achieved, which is particularly advantageous when such telescopic tubes are used for support jacks or the like, because fuel savings can be achieved for the transport vehicle, or the cargo payload can be increased.

The component and tube may also be made of the same material.

Preferably, the first attachment structures of the component are at least one holding protrusion. The holding protrusion is preferably an edge portion of the component. Edge portions are advantageous for the reason that, in plates or plate-shaped components no further additional protrusions need to be attached.

Preferably, the second attachment structure of the tube are at least one mounting opening. The mounting opening may be a circular peripherally opening or also a recess. The embodiments of the first and second attachment structures have the advantage that simple plugging together is possible.

Since the device is preferably to be mounted completely in the interior of the tube, it is advantageous if the dimension of at least one second attachment structure is greater in the direction of the longitudinal axis L, preferably the axial dimension of the mounting opening in the direction of longitudinal axis L, than the axial dimension of the first attachment structures, preferably the thickness of the holding protrusion. Thus, a simple pivoting of the component into the mounting opening is possible. Preferably, a second mounting opening is provided so that a form-locking connection can be carried out at two points.

After inserting the holding protrusion the mounting opening is not completely filled, in particular if for reasons of assembly the mounting opening is selected larger in diameter than the cross-section of the holding protrusion. To achieve a form-locking fixation of the component, plug-in elements are used The third attachment structures of the plug-in element are preferably at least one plug-in protrusion.

This male protrusion at least partially fills the mounting opening, and preferably the remaining part of the mounting opening is filled after inserting the protrusion of the component in the mounting hole.

The formation of the male protrusion may be embodied in different ways, which on one hand depends on the design of the first attachment structures and the other part of the design of the second attachment structures. Preferably, a rectangular mounting opening and a rectangular cross-section are formed in the holding protrusion. The remaining free space in the mounting opening is also rectangular in this embodiment. Adapting the plug-in protrusion of the male protrusion to this rectangular shape of the remaining opening is therefore preferable.

A first embodiment of the male protrusion provides at least one initial web, to which the first attachment structures of the component are connected. Preferably the first web is horizontal in relation to the vertical orientation of the telescopic tube.

When the telescope tube is under load, such as in operation as support jack, there is a force flux in the component and the tube. The form-locking connection may be made with the plug-in element or the plug-in protrusion and therefore may be indirect or direct without involvement in the force flux. Both variants can be selected via the mounting position of the plug element. The arrangement in the force flux has the advantage that the plug-in element is additionally fixed via clamping forces.

According to a further embodiment the plug-in element may feature two parallel webs that are arranged parallel to one another, between which webs a receiving groove is formed for the first attachment structures.

According to a further embodiment, the plug-in element has at least one second web, which is arranged perpendicular to the first web. Preferably the second web is a vertical web in relation to the vertical arrangement of the telescopic tube. The inclusion of these two webs results in a connection in two mutually perpendicular directions.

It is also possible to combine two or more plug-in elements in a mounting opening.

The material of the plug-in element may be made of aluminum, aluminum alloy, titanium alloy, steel or plastic.

Preferably, the plug-in element is made of the same material as the tube. This makes it possible to weld the plug-in element to the tube at least at certain points in order to fasten the plug-in element.

A material connection of plug-in element and tube is preferred, which besides by welding can also be achieved via gluing or soldering.

A forced connection between plug-in element and tube may, upon preference, be made via screws.

Preferably, the device is additionally force-connected to the tube. One special embodiment provides that this type of fixation is made on one side of the component where first attachment structures are not provided. By the additional forced connection, the stability of the combination of component and tube is further increased.

The support jack according to the invention is comprised of a telescopic tube as well as a spindle, wherein the component is a bearing block for the spindle, and the bearing block is fixed to the outer tube.

Preferably the outer tube has a rectangular, in particular a square cross-section with a rear wall, front wall and two side walls.

The attachment is preferably connected with at least two walls, in particular side walls, with interlocking connection via the plug-in elements. This ensures that at least two walls of the tube are in line of direct force flow. This largely avoids bending or torsion of the plug-in element or elements, to the extent that they occur during power transmission. The relevant areas mainly experience compression.

Preferably in the loaded state of the support jack, the third attachment structures of the plug-in element are arranged between the first and second attachment structures in the force flux, which has the advantage that the plug-in elements are held in place by clamping forces.

The assembly process according t the invention of at least one component, which has first attachment structures, at least on or in a tube, and second attachment structures, of a telescopic tube having a longitudinal axis L, comprises the following method steps:

a) Translatory insertion of the component into the tube in a tilted state with respect to the longitudinal axis L (T1), b) Alignment of the component and insertion of the first attachment structures of the component into the second attachment structures of the tube (R2 and T3), c) Plugging of at least one plug-in element having third attachment structures into the second attachment structures of the tube, wherein the third attachment structures cooperate with the first and second attachment structures for form-lockingly connecting the component and d) Connecting the plug-in element and the tube by at least one of a force-locking connection and a materially bonding connection.

When aligning the component, it is preferably aligned perpendicularly to the longitudinal axis L, and therefore in the installed position.

Preferably the plug-in element is inserted from the outside of the tube. It is also possible to insert a plug-in element from the inside of the tube.

Preferably the component is additionally connected to the tube in a force-locking manner.

Preferably between steps b) and c) the component is displaced perpendicularly to the longitudinal axis L (T4). This displacement preferably takes place in the direction of the rear wall to create free space between the front wall of the tube and the component, and optionally provide an additional fastening at the rear wall.

According to one embodiment, the first of two attachment structures of the component is introduced into a first second attachment structure in step b), then the first component is oriented perpendicular to the longitudinal axis L and the second component is inserted perpendicular to the longitudinal axis into a further second attachment structure.

The plug-in element is preferably in addition materially bonded with the tube.

Exemplary embodiments of the invention are referenced in detail in the drawings below. the drawings are provided for purely illustrated purposes and are not intended to limit the scope of the present invention.

BRIEF DESCRIPTION OF THE DRAWINGS

In the drawings,

FIGS. 3 to 6 show various sectional views and top plan views illustrating the assembly steps;

FIGS. 7 through 13a and 13b show various perspective views of embodiments of a plug-in element;

DETAILED DESCRIPTION OF THE DRAWINGS

Figure 1:
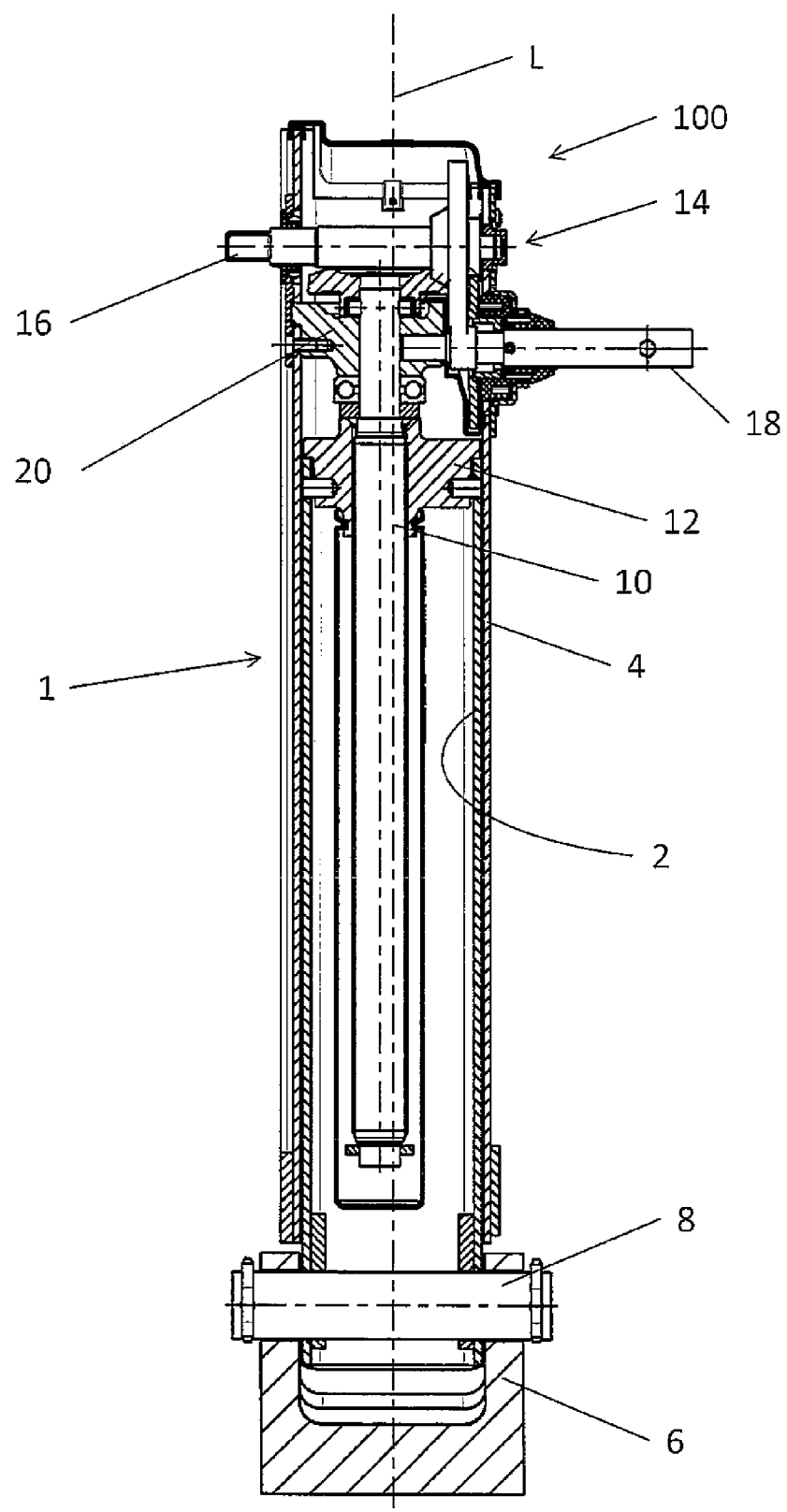
FIG. 1 shows a vertical cross-section of a support jack.

In FIG. 1, a support jack 100 with a length-adjustable telescopic tube 1 with inner tube 2 and outer tube 4 is shown in a vertical cross-section. The telescopic tube 1 has a longitudinal axis L. In the upper region, the support jack 100 contains a gear 14 with gear output shaft 16 and input shaft 18. A spindle 10 and the transmission input shaft 18 are mounted together in a bearing block, which forms component 20. Component 20 is fixed in the outer tube 4, as will be explained in detail below with reference to the drawings.

A spindle nut 12 is mounted on inner tube 2. Also, a foot element 6 attached to inner tube 2 via bolt 8.

Figure 2:
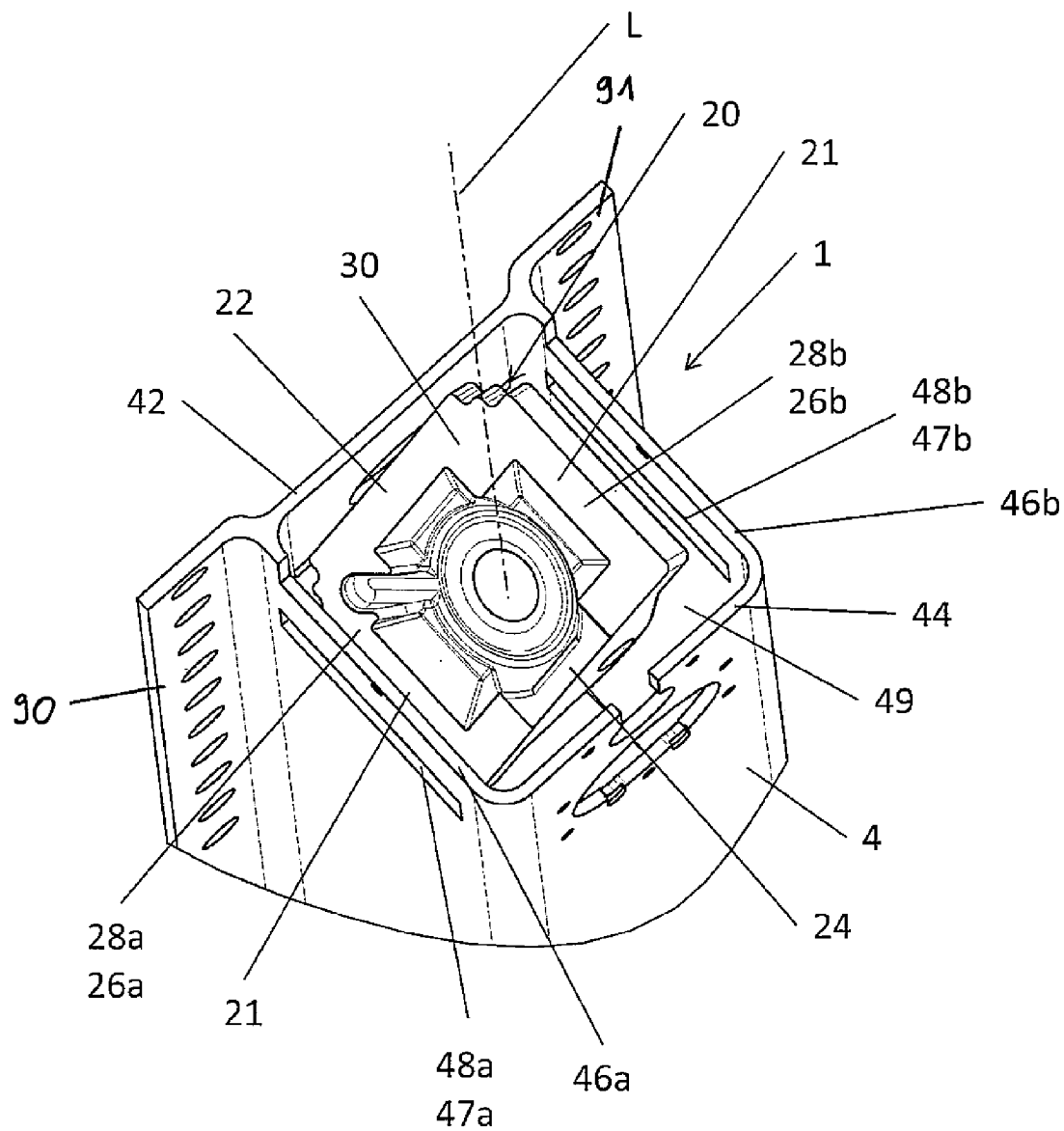
FIG. 2 shows a perspective top plan view onto an outer tube with a component at the beginning of the assembly process.

FIG. 2 shows a perspective top plan view on the upper part of outer tube 4, wherein component 20 is shown tilted for subsequent attachment in the outer tube 4. Component 20 with top surface 30 essentially consists of a rectangular plate with the four edge portions 22, 24, 26a and 26b, wherein the edge portions 26a and 26b form the first attachment structures 28a and 28b and thus holding protrusions 21.

The outer tube 4 correspondingly has a square cross-section and a rear wall 42, a front wall 44 and two side walls 46a and 46b, wherein the rear wall 42 laterally has two mounting plates 90 and 91. The dimensions of component 20 are selected such that a free space 49 remains between the front edge portion 24 and front wall 44, for insertion of a portion of the transmission 14 (see FIG. 1).

In both opposite side walls 46a and 46b, second attachment structures 48a and 48b in the form of rectangular mounting openings 47a and 47b are provided, into which the lateral edge portions 26a and 26b engage. The mounting openings 47a and 47b are aligned perpendicular to the longitudinal axis L.

The assembly procedure is illustrated in FIGS. 3 through 6, wherein each of the upper part of the figure shows a vertical section through the outer tube 4 and the lower part of the figure shows the corresponding top plan view.

FIG. 3 shows the situation according to FIG. 2, wherein component 20 is tilted with respect to the longitudinal axis L and inserted into the interior of outer tube T1 via a translatory movement.

Via a pivoting motion (R2), component 20 is aligned perpendicular to the longitudinal axis L and inserted with the lateral edge portion 26a into the mounting opening 47a (see FIG. 4).

Via a subsequent translatory movement T3 to the right, the edge portion 26b is also inserted into the mounting opening 47b of the side wall 46b (FIG. 5).

Subsequently, component 20 is pushed via translatory movement T4 to the rear wall 42 where, if desired, a force-locking connection may be used, for example with screw 32 (see also FIG. 16).

Before the force-locking connection, the plug-in elements 50, 60, or 70 are inserted into the mounting openings 47a and 47b.

The various embodiments of plug-in elements 50, 60, 70 are shown in FIGS. 7 to 13a and 13b.

All plug-in elements 50, 60, and 70 have a plate 52, 62, and 72, on which at least one plug-in protrusion 51, 61, and 71 is arranged, which form the third attachment structures 58, 68, and 78.

Figure 7:
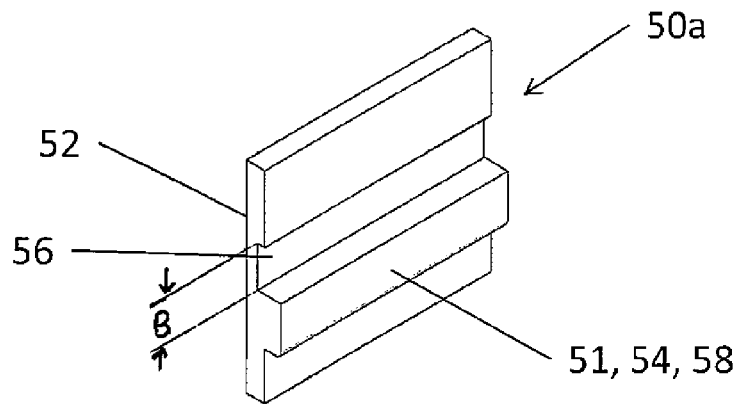
Figure 8:
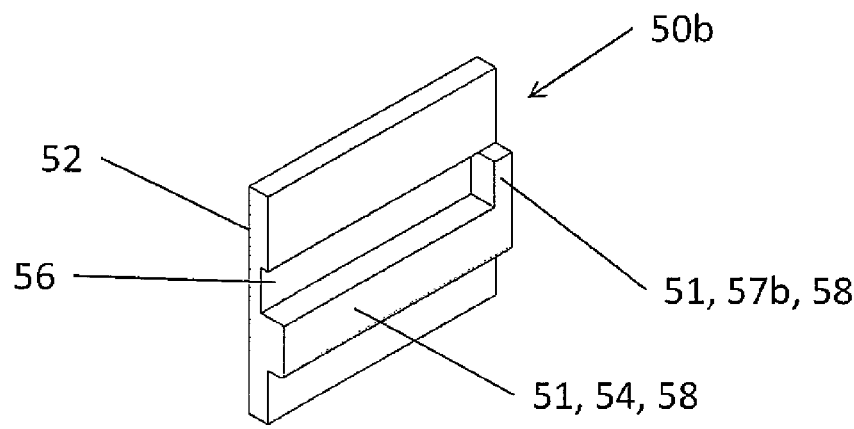
Figure 9:
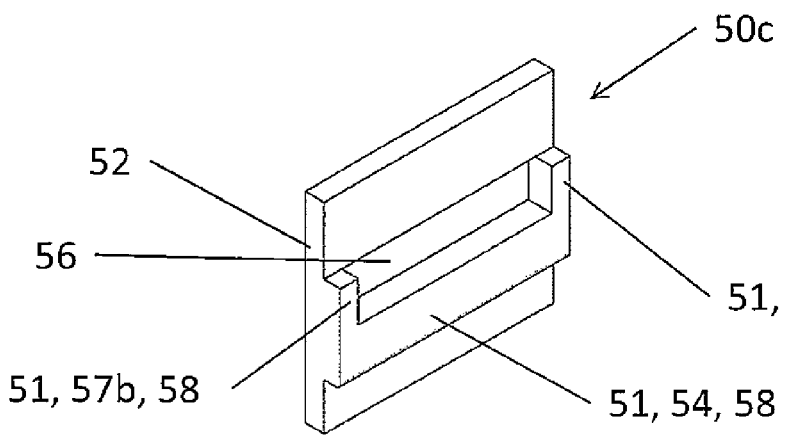

FIGS. 7 through 9 show a first embodiment of plug-in elements 50a, 50b, and 50c, which on a plate 52 show at least one first web 54 as plug-in protrusion 51 and third attachment structure 58. In addition to this first web 54, there may be second webs 57a and 57b (FIG. 8 or 9) perpendicularly arranged as plug-in protrusions 51 and third attachment structures 58 arranged at one end or at the ends of first web 54.

While the first web 54 creates a form-locking connection in the vertical direction, the second webs 57a and 57b can create a form-locking horizontal connection. Depending on the type of plug-in element, the web may be aligned in the direction of the force flux (see e.g., Arrow K in FIG. 15) or outside of the direction of the force flux via rotation by 180°.

Adjacent to the first web 54, a receiving groove 56 is arranged, whose width B is adapted to the thickness of the edge portions 26a and 26b.

Figure 10:
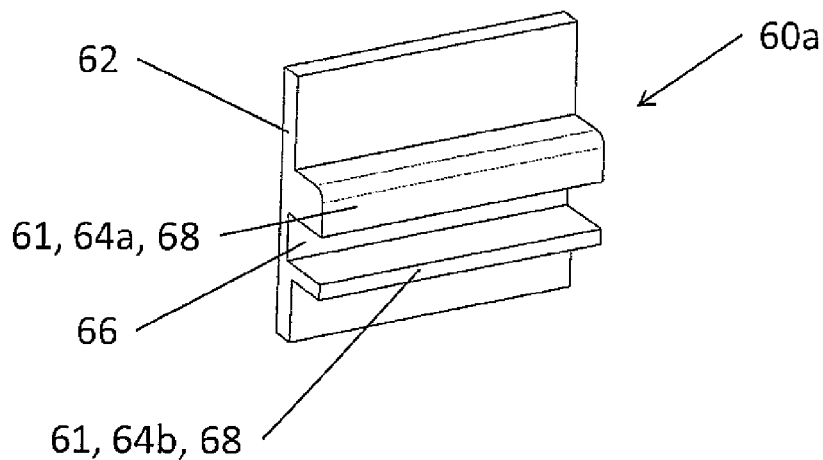
Figure 11:
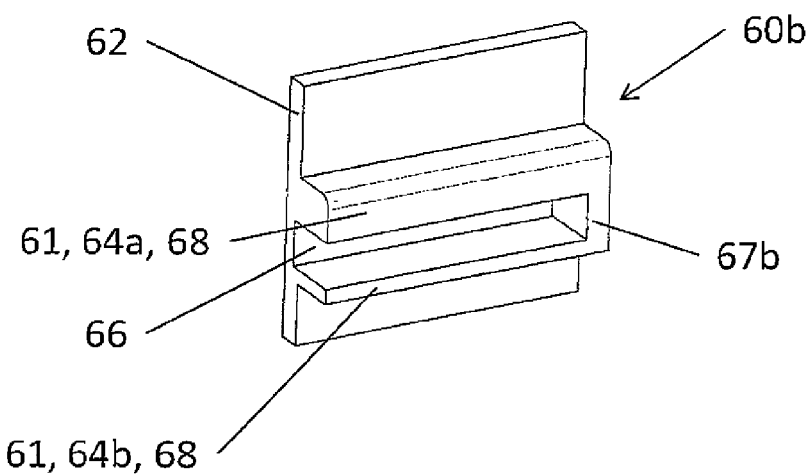
Figure 12:
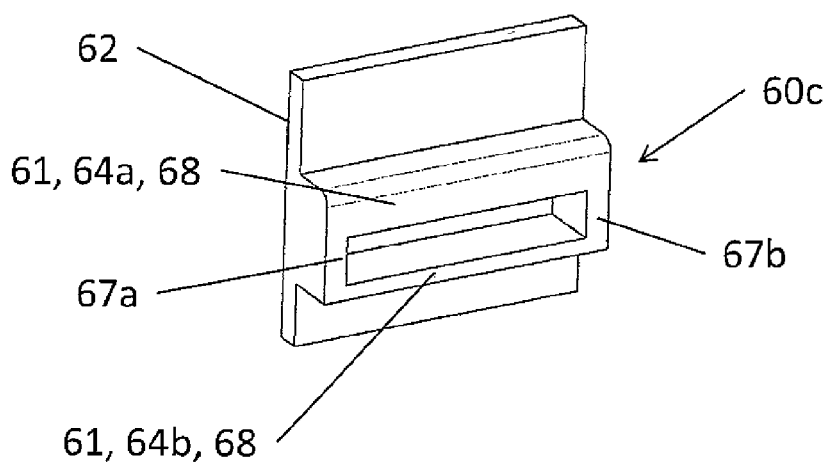

FIGS. 10 through 12 illustrate a second embodiment of the plug-in element 60a, 60b, and 60c with plate 62 and with two first webs 64a and 64b as plug-in protrusions 61 and third attachment structures 68, wherein a receiving groove 66 is formed between webs 64a and 64b. Like the first embodiment, this embodiment may also be equipped with one or two second webs 67a and 67b arranged perpendicular to the first webs as plug-in protrusions 61 and with third attachment structures 68 (see FIG. 11 or 12).

All embodiments 50 and 60 shown are inserted into mounting opening 47a and 47b from the outside.

Figure 13A:
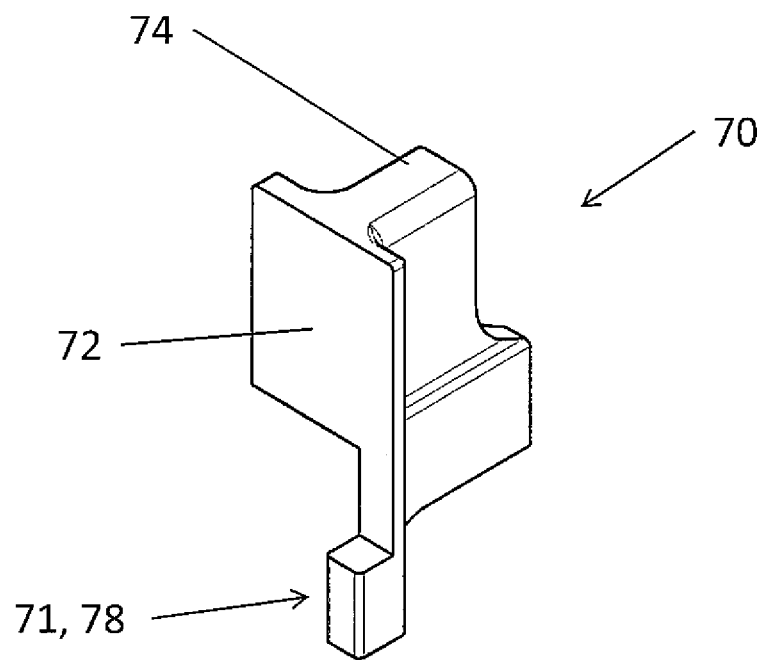
Figure 13B:
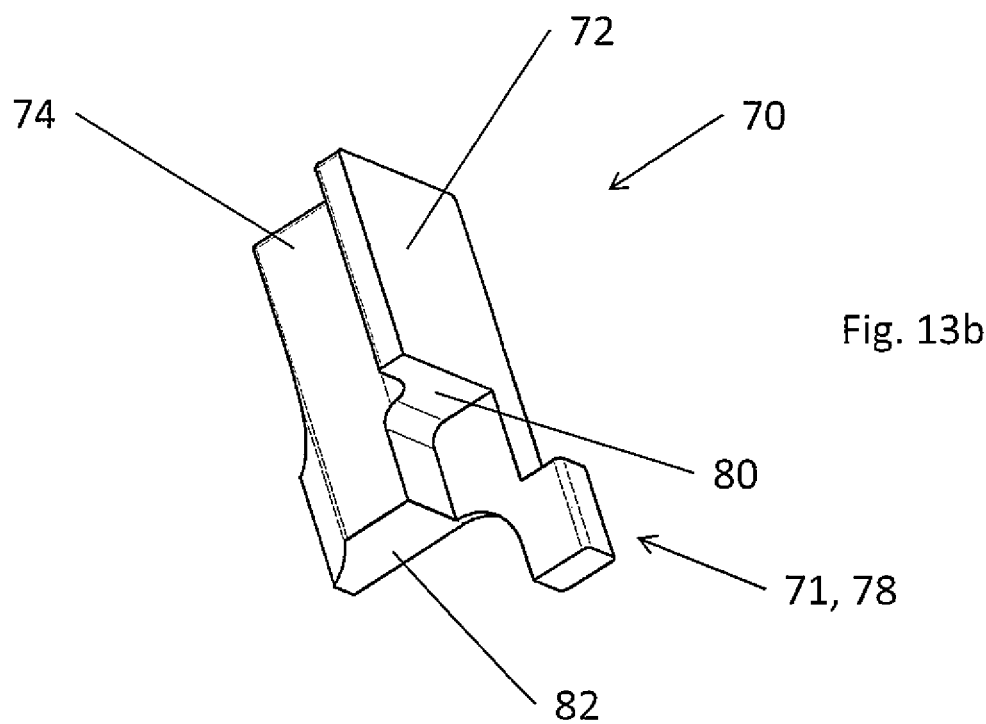

In FIGS. 13a and 13b, a third embodiment of a plug-in element 70 is shown in two perspective views, which are preferably combined with one of the plug-in elements 50 and 60 of the first and second embodiment according to FIGS. 7, 8 and 10, 11.

This third embodiment is preferably inserted from the inside into the mounting opening 47a and 47b.

The plug-in element 70 has a base body 74 with a plate 72 and a plug-in protrusion 71 that forms the third attachment structure 78. With the first bearing surface 80, the plug-in element 70 lies, e.g., above a plug-in element 60 in an assembled state. With the staggered second bearing surface 82, plug-in element 70 is located on the upper surface 30 of component 20. With plate 72, the plug-in element 70 is located on the inner surface of the outer tube 4. Overall, this results in an additional stiffening and securing (see also FIGS. 21 and 22).

Figure 14:
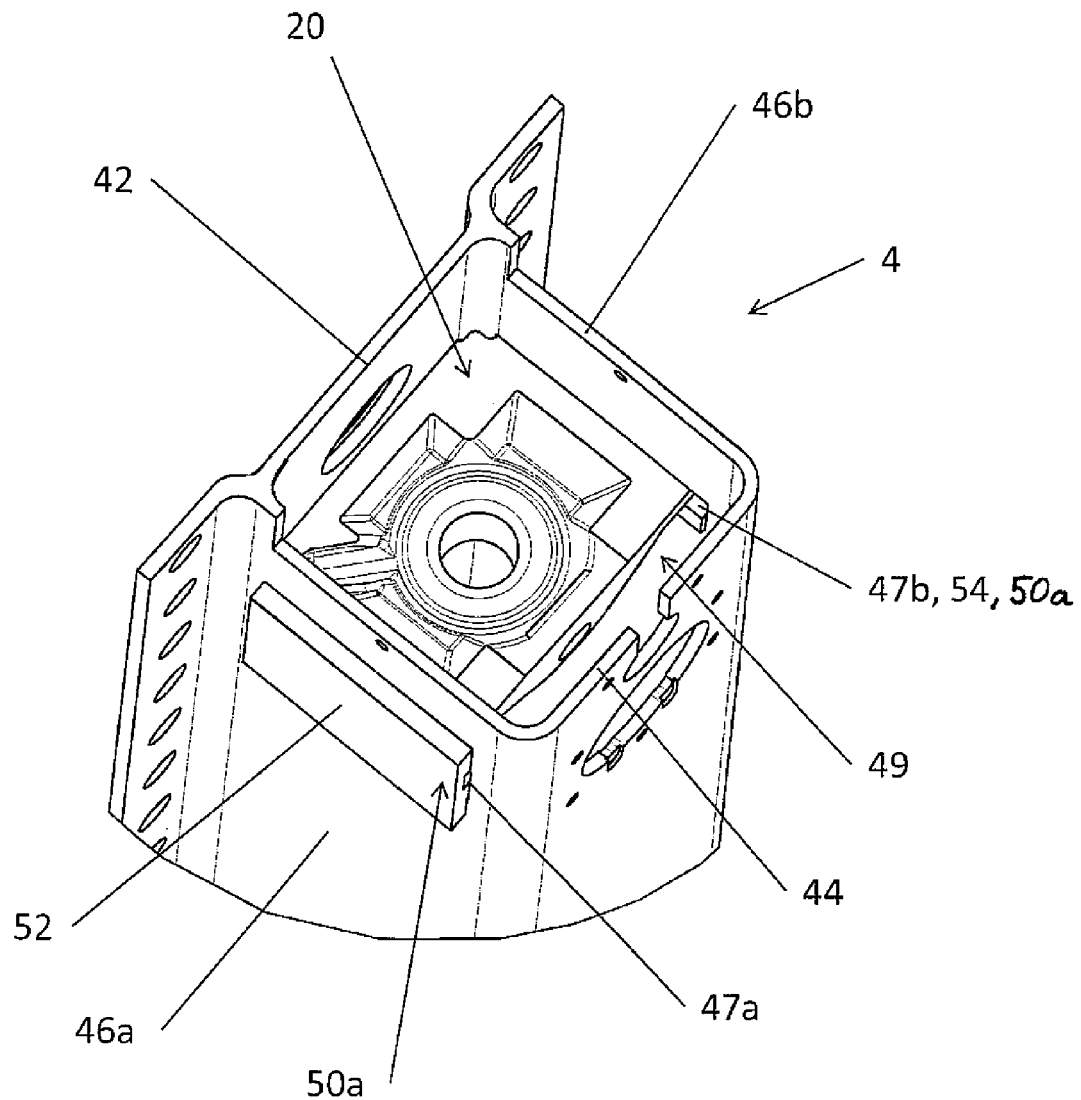
FIG. 14 shows a perspective top plan view of a tube having a component in the mounted state according to an embodiment.

FIG. 14 shows a top perspective top view of outer tube 4 with mounted component 20. A plug-in element 50a is inserted from the outside in mounting openings 47a and 47b (see FIG. 7). Plate 52 of the plug-in element 50a abuts on the outside of side wall 46a. The same applies to plug-in element 50a on the side wall 46b.

Figure 15:
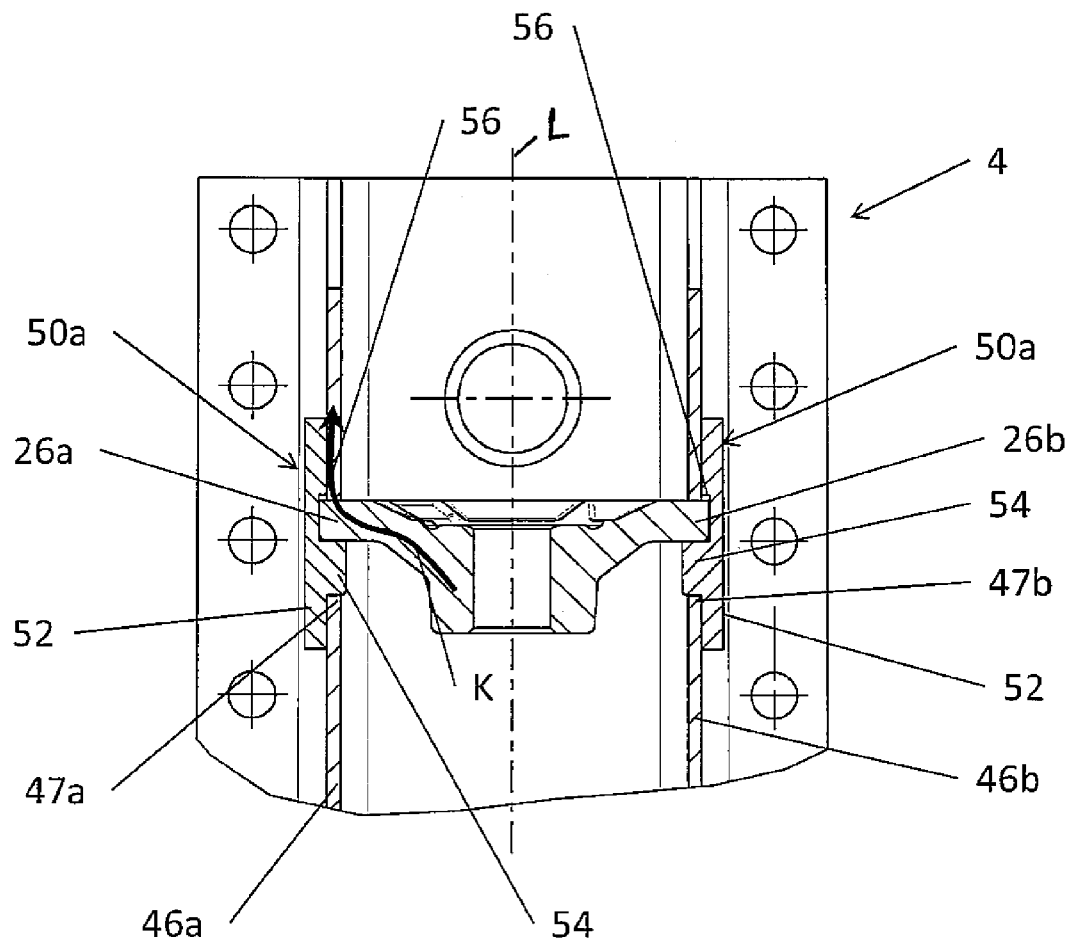
FIGS. 15 and 16 show vertical sections of the arrangement shown in FIG. 14.

FIG. 15 shows a vertical section of the outer tube 4 shown in FIG. 14. The first webs 54 of plug-in elements 50a engage in the mounting openings 47a and 47b. The edge portions 26a and 26b of the component 20 likewise engage in the mounting openings 47a and 47b and lie on the webs 54. The mounting opening 47a and 47b is filled in the direction of the longitudinal axis L by web 54 and the respective edge portion 26a and 26b, and so a form-locking connection in the longitudinal direction L is ensured. The force flux during operation of support jack is indicated by the arrow K. Web 54 is outside of the force flux.

Figure 16:
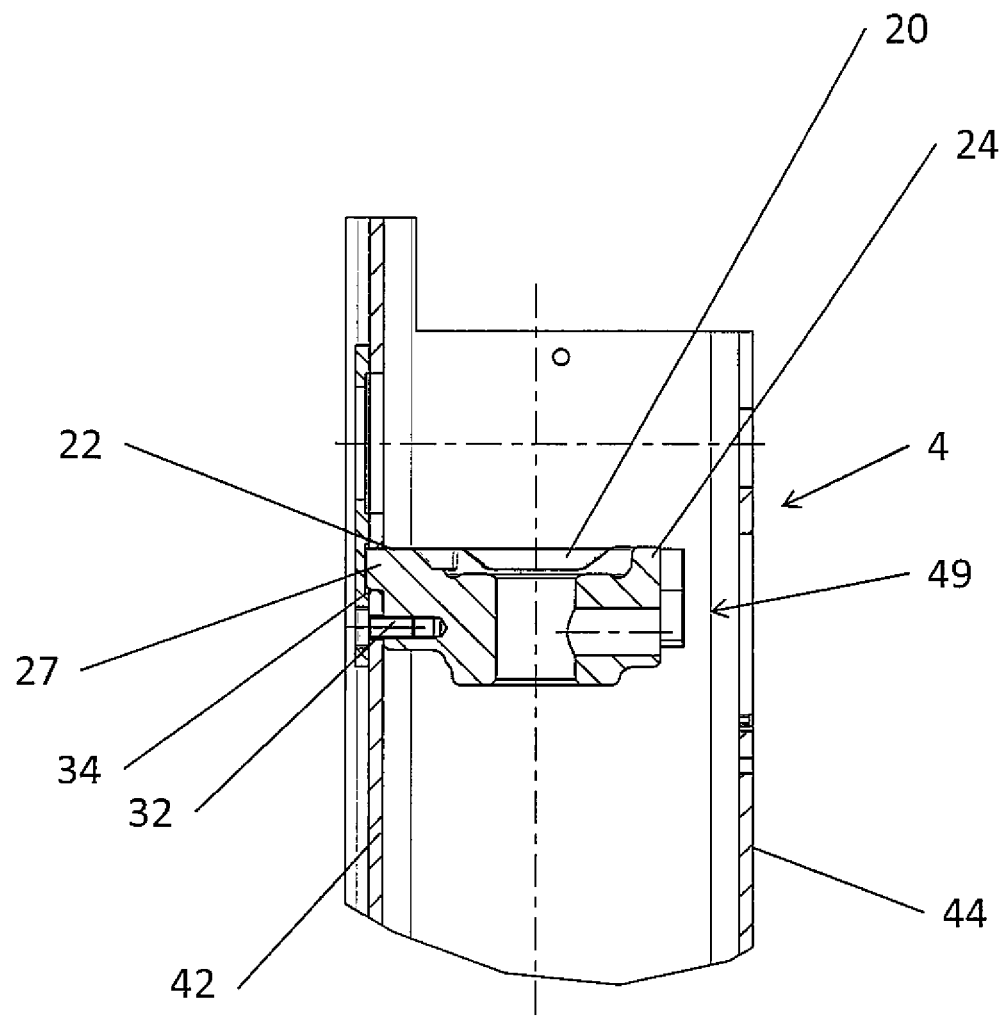

FIG. 16 shows a further sectional view of the outer tube 4 shown in FIG. 14.

Between the front edge portion 24 of component 20 and front wall 44, there is a space 49 (see also FIG. 2). The rear edge portion 22 of component 20 is located on rear wall 42 and force-lock connected there by at least one screw 32. Component 20 also has an additional protrusion 27 at the rear edge portion 22 which engages into a corresponding opening 34 on rear wall 42. This provides additional fixation in rear wall area, even if no plug-in element with third attachment structures is used there. Instead of screw 32 a different a plug-in element can be provided which can be fastened to the tube in the same way as the other elements of the tube plug-in elements.

Figure 17A:
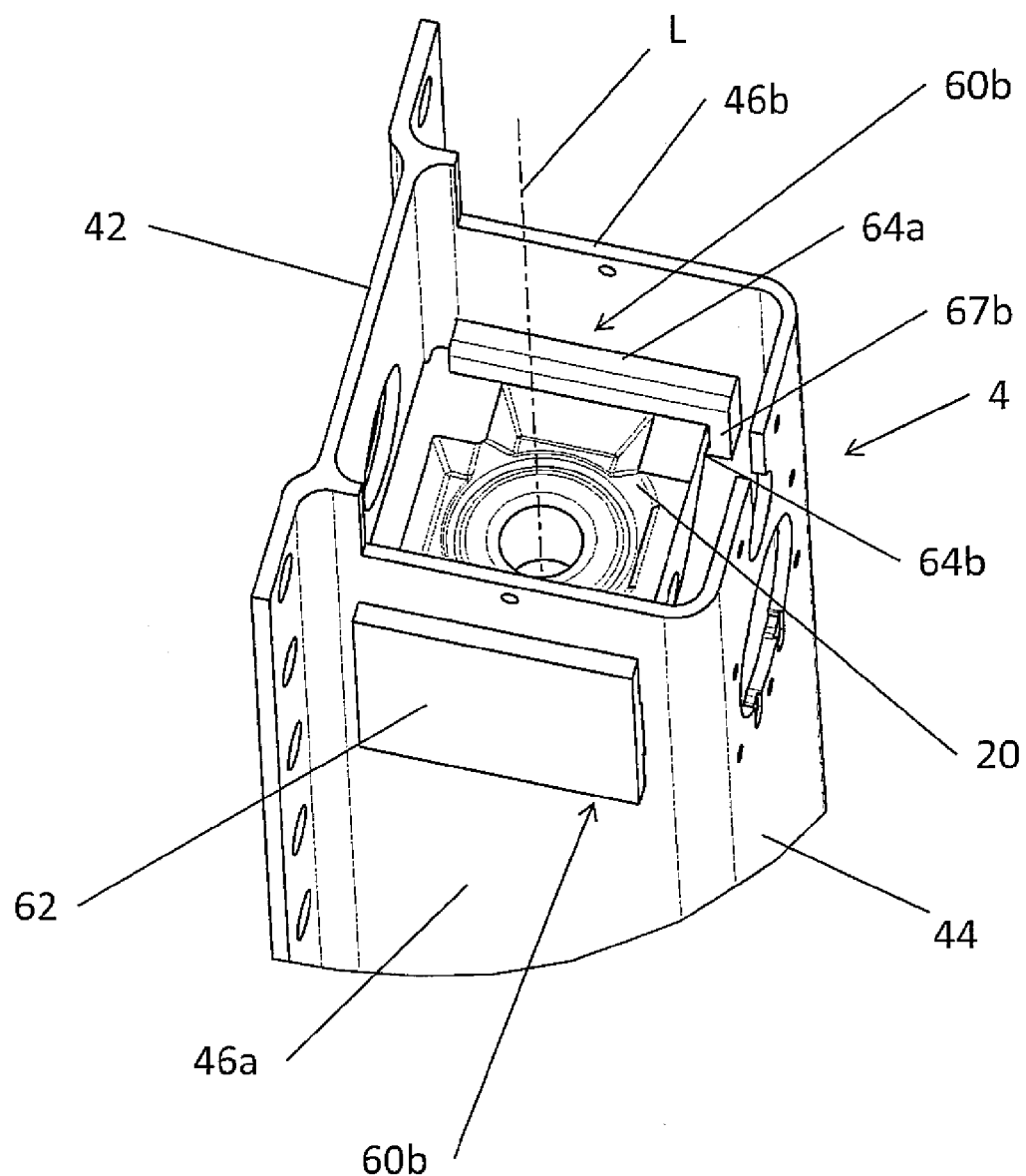
FIGS. 17a and 17b show perspective top plan views of a tube having a component according to further embodiments.

FIGS. 17a through 19 show a further embodiment. FIG. 17a is a perspective top plan view an outer tube 4 having a component 20 where plug-in elements 60b (see FIG. 11) are used. Plug-in element 60b has a second web 67b, so that in addition to the form-locking connection of device 20 in the direction of the longitudinal axis L, an additional form-locking connection is created perpendicular to the longitudinal axis L.

The plug-in elements 60b are bonded, e.g., via welding or adhesive bonding to the side wall 46a and 46b respectively.

Figure 17B:
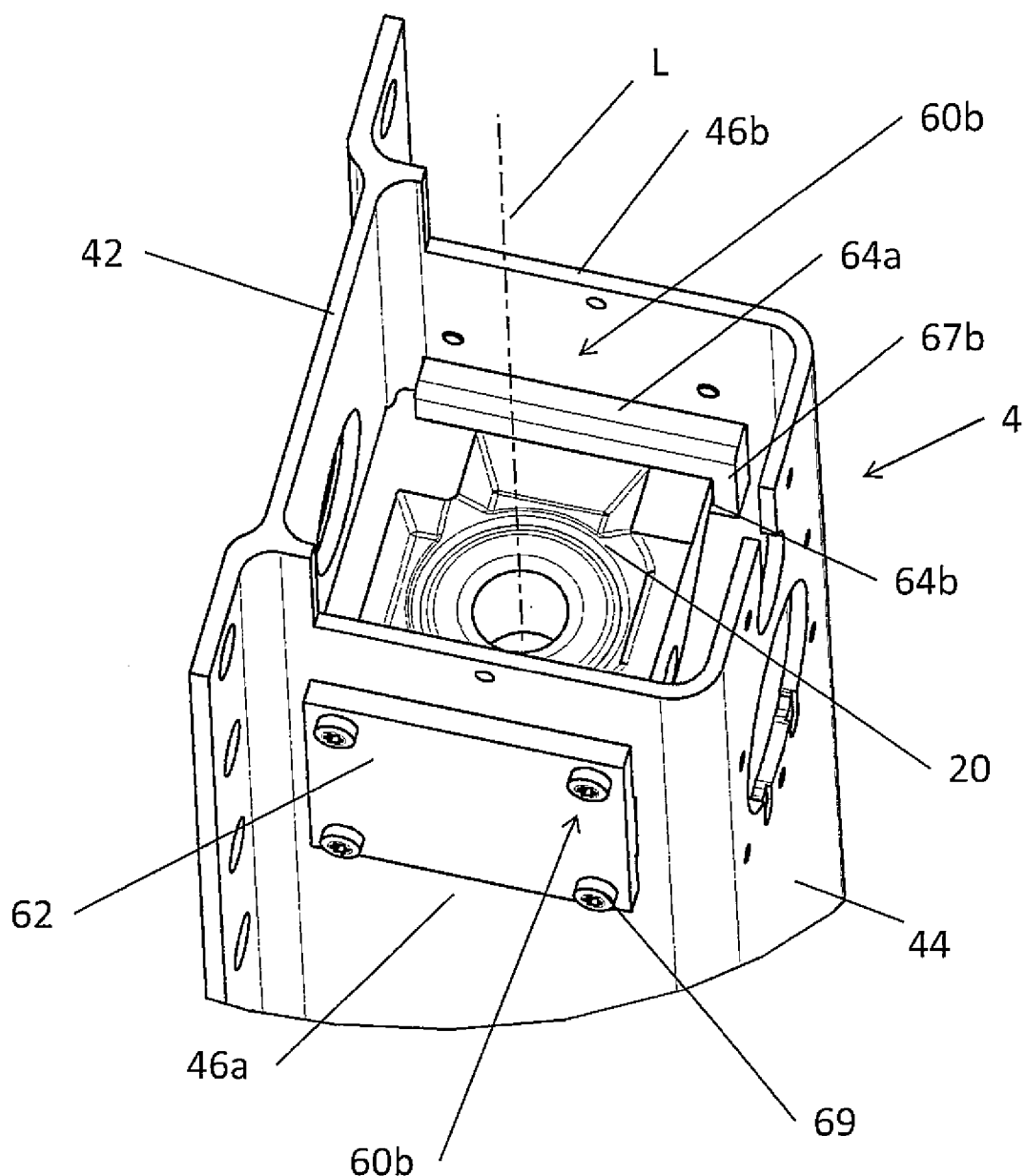

In FIG. 17b, the plug-in elements 60b are force-locked via the bolts 69 to side walls 46a and 46b.

Figure 18A:
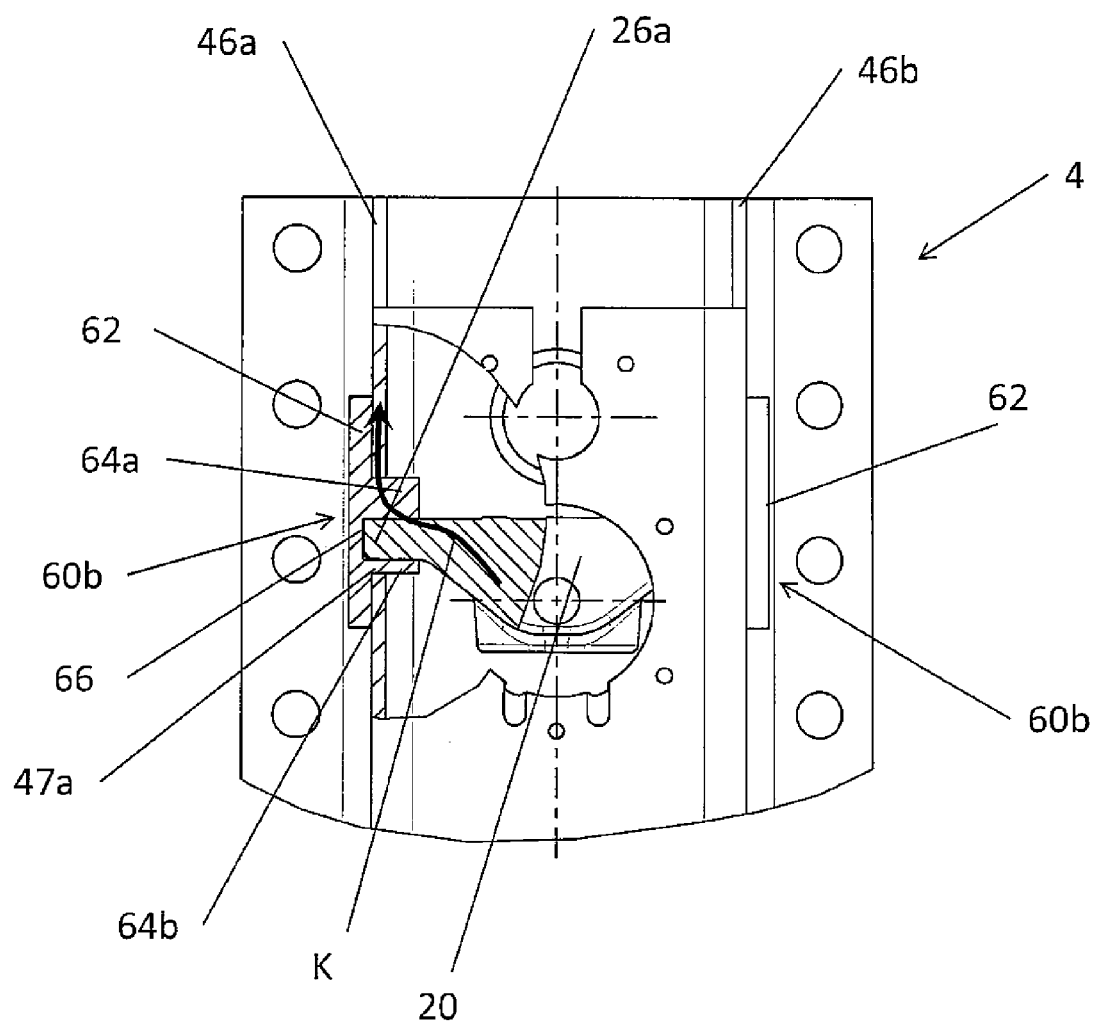
FIGS. 18a, 18b and 19 show sections of the arrangements shown in FIGS. 17a and 17b, and FIGS. 20, 21 and 22 show perspective top plan views of a tube having a component according to a further embodiment.

FIG. 18a is a further partial illustration of the embodiment shown in FIG. 17a. The lateral edge portion 26a of component 20 is inserted into the receiving groove 66 of plug-in element 60b between the two webs 64a and 64b web 64a is under load during force flux (see arrow C).

Figure 18B:
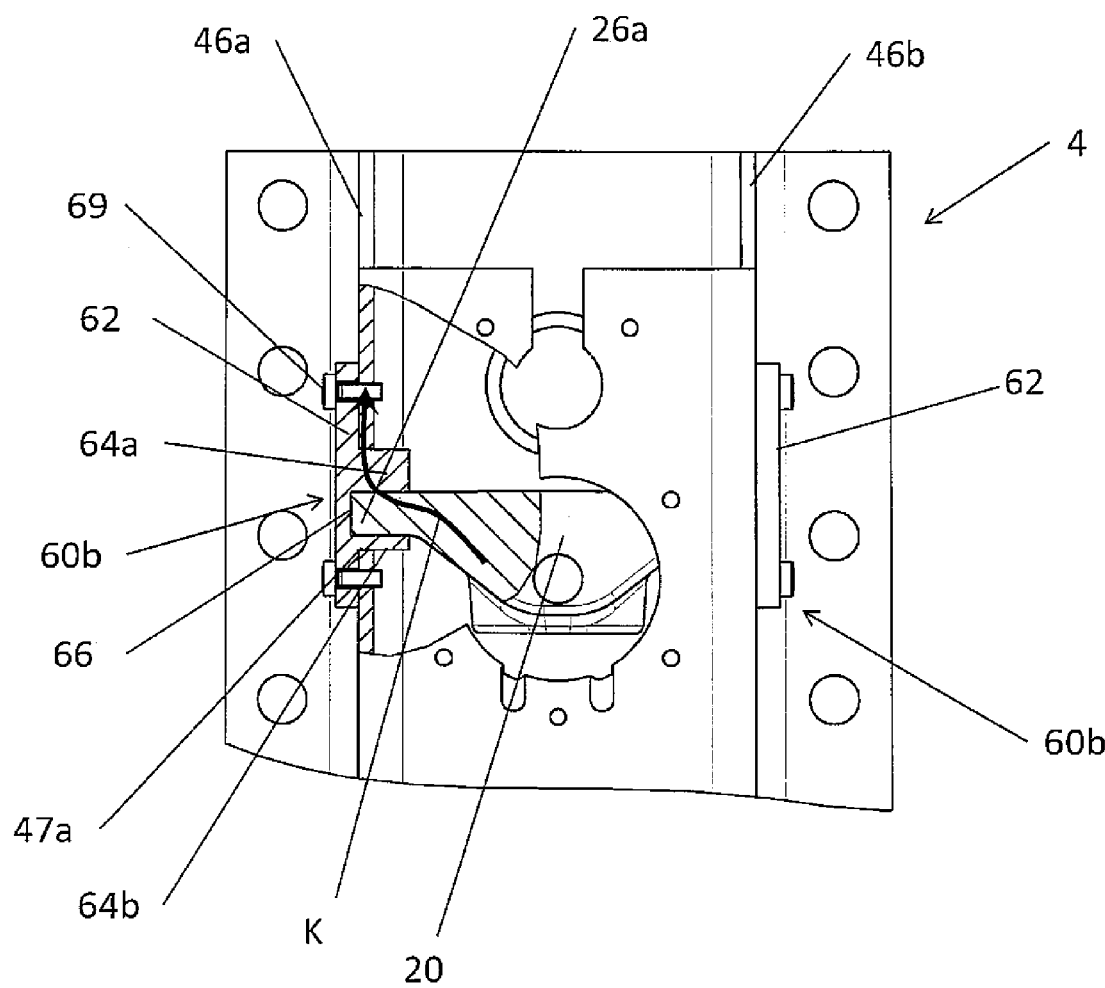

FIG. 18b is a view corresponding to FIG. 18a, to illustrate the connection of the plug plug-in elements 60b to plate 62 via screws 69.

Figure 19:
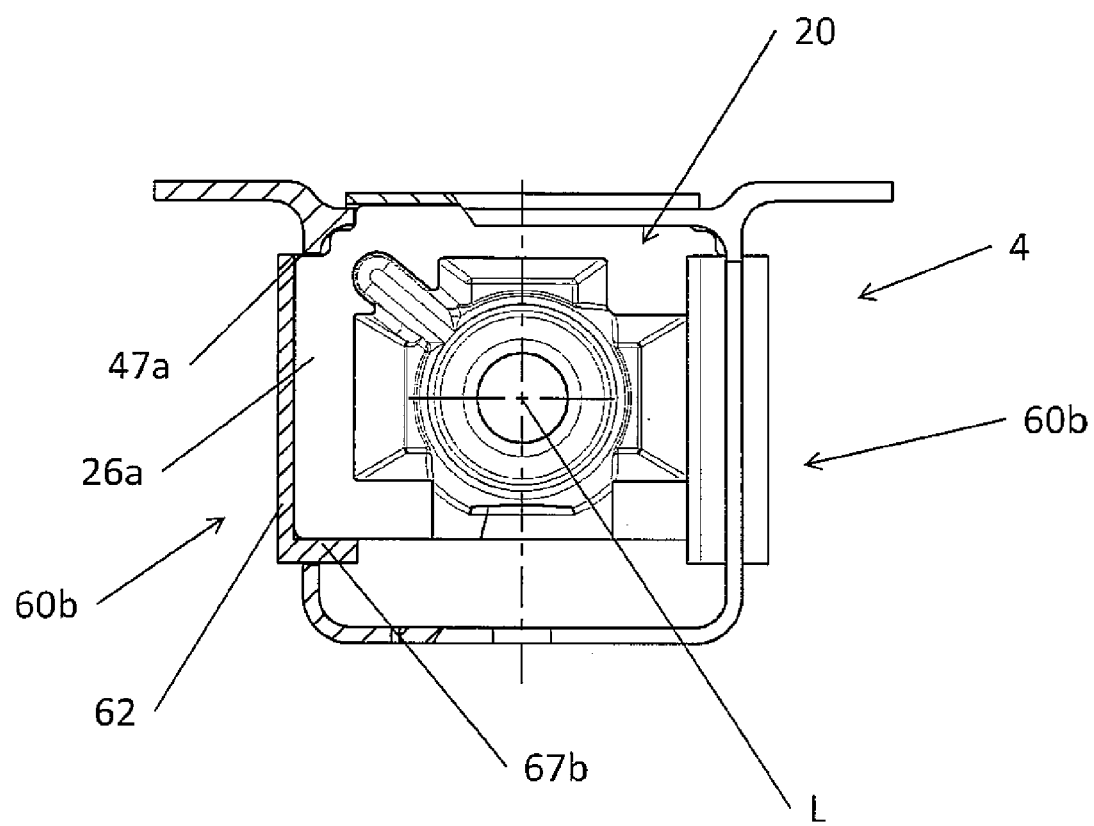

FIG. 19 shows a top view and of embodiment partly shown in FIG. 17, which shows that the edge portion 26a abuts on plug-in element 60b of plate 62 and the second web 67b, which ensures a fixation perpendicular to the longitudinal axis.

Figure 20:
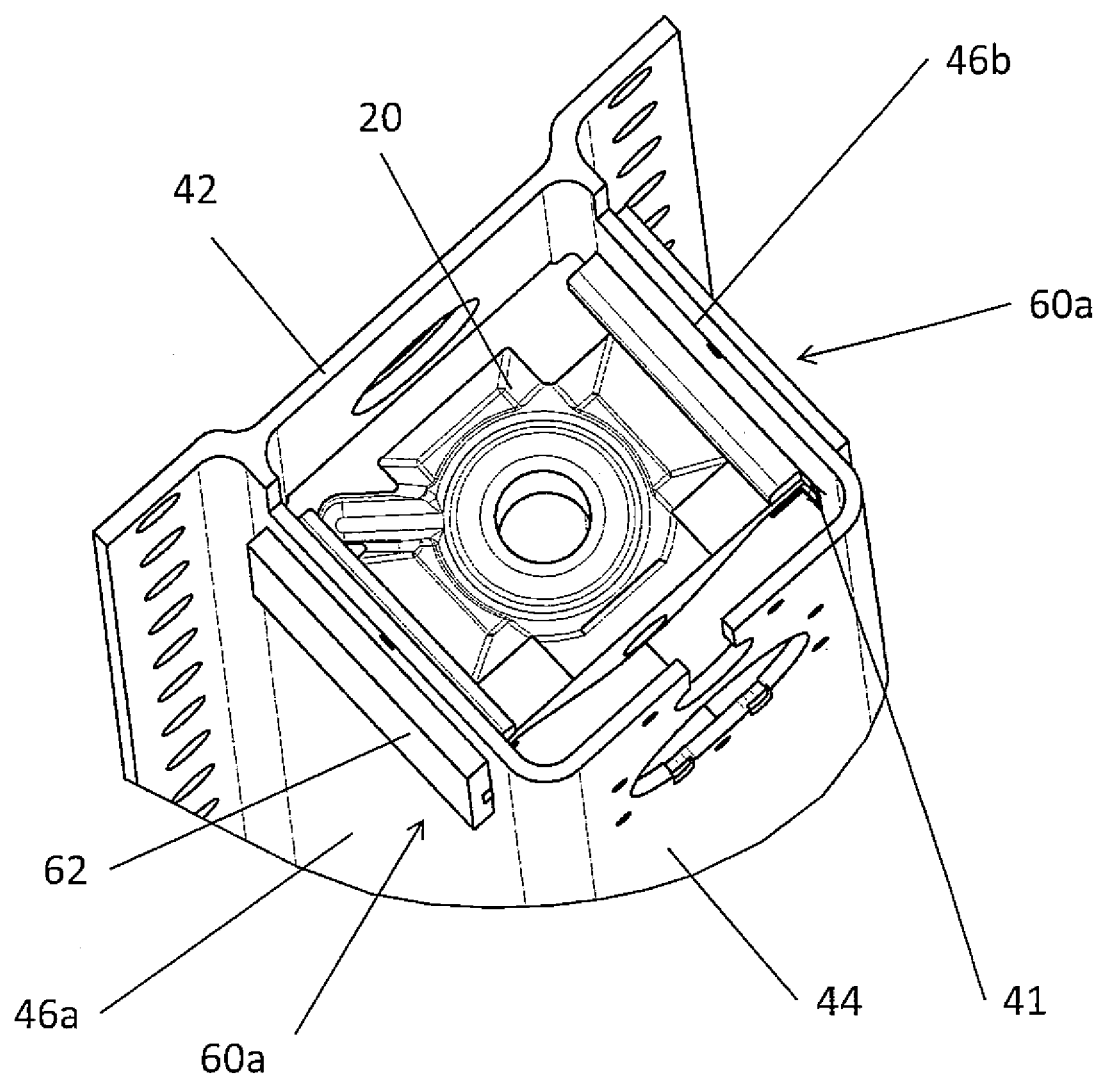

FIG. 20 shows a top perspective view of a further embodiment, wherein plug-in elements 60a are used (see FIG. 10). Since the plug-in elements 60a do not have a second web 67b, a free space 41 remains in mounting opening 47a and 47b. To ensure a form-locking fixation in the direction perpendicular to the longitudinal axis L, at this point an additional plug-in element 70 (FIGS. 13a and 13b) is used from the inner side, whose plug-in protrusion 71 fits space 41. This is illustrated in FIGS. 21 and 22 in more detail where the side walls 22 have been omitted so that the plug-in protrusion 71 is clearly seen in addition to the edge portion 26a.

Figure 21:
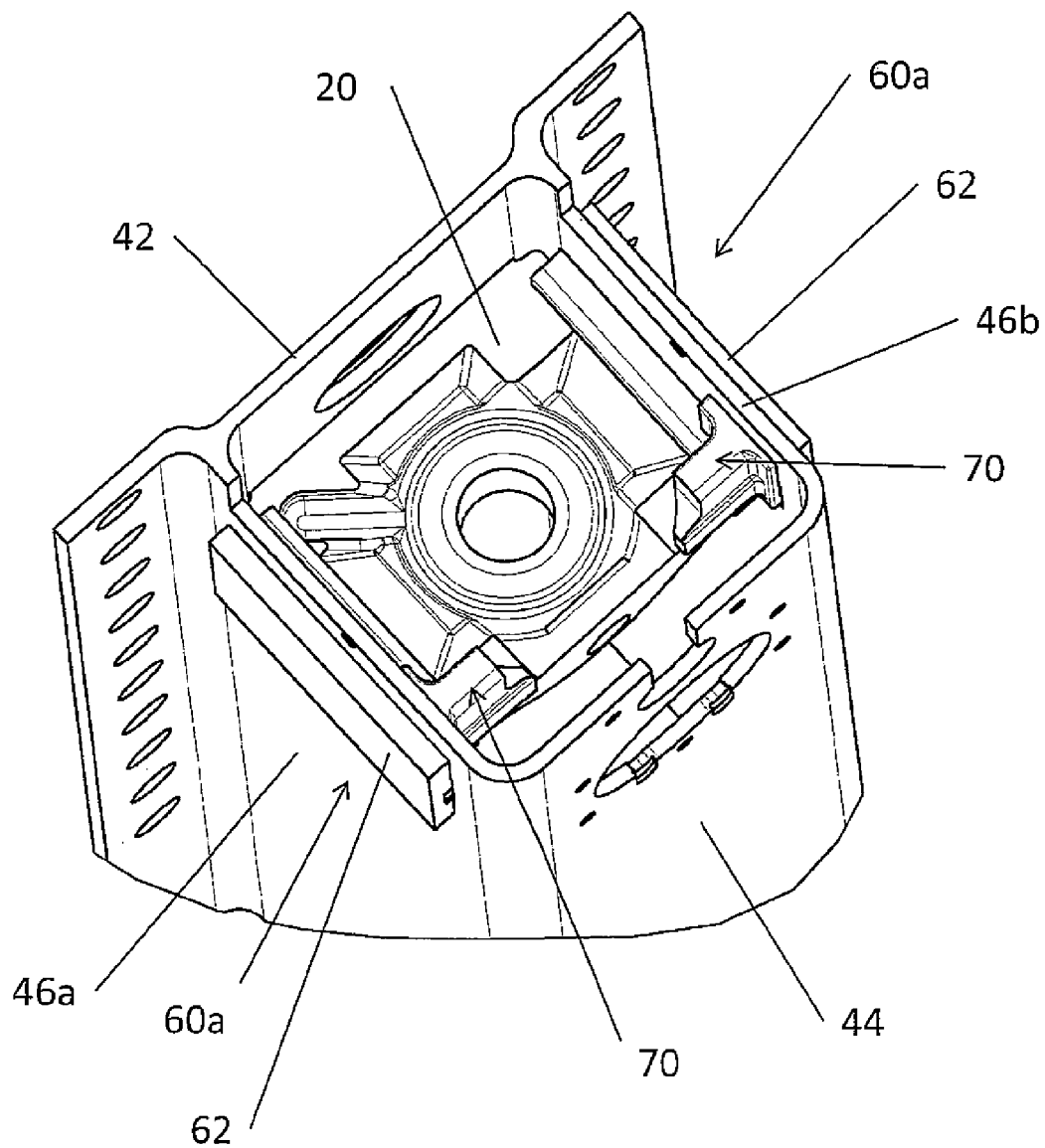
Figure 22:
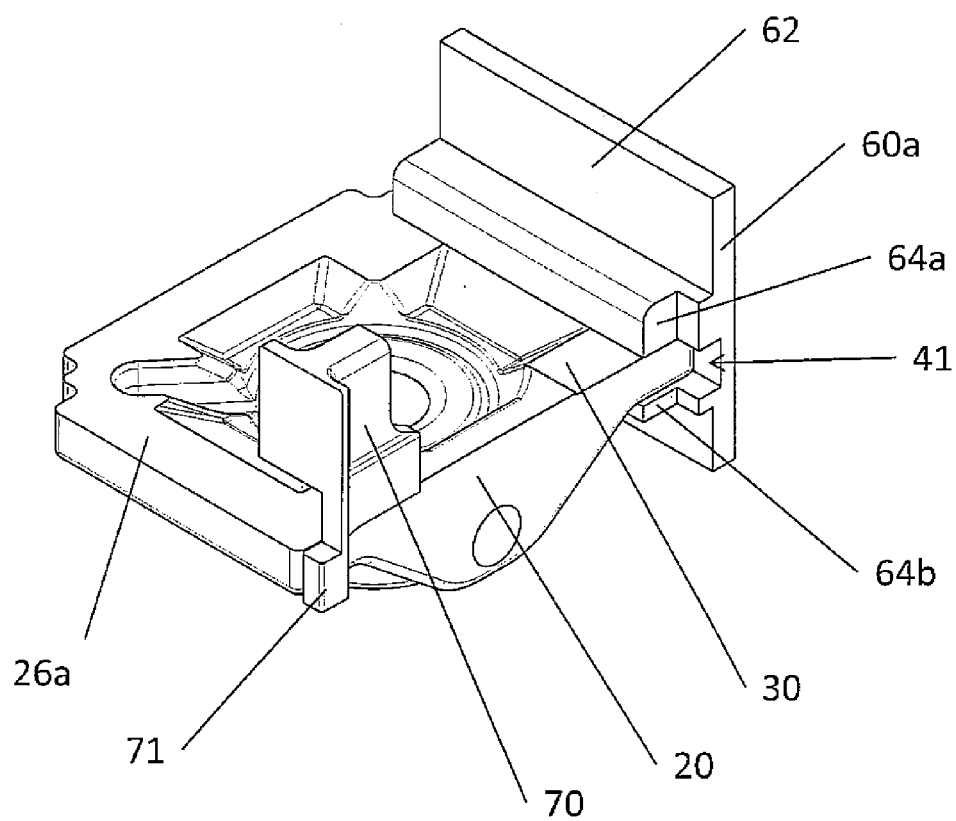

As FIG. 21 shows, plug plug-in element 70 with its plate 72 lies on the inside wall of 46a and 46b. Additionally, plug-in element 70 and its bearing surface 80 lies on the upper side of the first web 64a of plug-in element 60a and with bearing surface 82 on the upper side 30 of component 20.

While the above description constitutes preferred embodiments of the present invention, it will be apparent that the invention is susceptible to modification, variation, and change without departing from the proper scope and fair meaning of the accompanying claims.

What is claimed is:

1. A length-adjustable telescopic tube (1) with a longitudinal axis (L), comprising
an inner tube (2),
an outer tube (4),
at least one component (20) arranged in or on at least one of the inner tube and the outer tube (2, 4),
at least one plug-in element (50, 60, 70),
first attachment structures (28a, 28b) on the component (20),
second attachment structures (48a, 48b) on at least one of the inner tube (2) and the outer tube (4), and
third attachment structures (58, 68, 78) on the plug-in element, the third attachment structures cooperating with the first attachment structures (28a, 28b) and second attachment structures (48a, 48b) to create form-locking connections of the component (20),
wherein the plug-in element (50, 60, 70) is connected in a force-locking or material-bonding manner with the at least one of the inner tube (2) and the outer tube (4).

2. The telescopic tube according to claim 1, wherein the component (20) is a pressure-loaded component.

3. The telescopic tube according to claim 1, wherein the first attachment structures (28a, 28b) of the component (20) comprise at least one holding protrusion (21).

4. The telescopic tube according to claim 1, wherein the second attachment structures (48a, 48b) of the tube (2, 4) comprise at least one mounting opening (47a, 47b).

5. The telescopic tube according to claim 1, wherein the third attachment structures of the plug-in element (50, 60, and 70) comprise a plug-in protrusion (51, 61, and 71).

6. The telescopic tube according to claim 5, wherein the plug-in projection (51, 61, 71) comprises at least one web (54, 57, 64, 67), on which the first attachment structures (28a, 28b) of the component (20) abuts.

7. The telescopic tube according to claim 1, wherein the tube (2, 4) and the component (20) consist of different materials.

8. The telescopic tube according to claim 1, wherein the plug-in element (50, 60, 70) consists of the same material as the tube (2, 4).

9. The telescopic tube according to claim 1, wherein the component (20) is additionally force-locked to the tube (2, 4).

10. A support jack (100) comprising a telescopic tube (1) according to claim 1 and a spindle (10), wherein the component (20) is a bearing bracket for the spindle (10) and the bearing bracket is attached on the outer tube (4).

11. The support jack according to claim 10, wherein the outer tube (4) has a rectangular cross-section with a rear wall (42), a front wall (44), and two side walls (46a, 46b), wherein the component (20) is form-lockingly connected to at least two of the rear wall (42), front wall (42), and side walls (46a, 46b) of the outer tube (4).

12. The support jack according to claim 10, wherein in the loaded state of the support jack (100), the third attachment structures of the plug-in element (50, 60, and 70) are arranged in the force flux between the first attachment structures (28*a*, 28*b*) and second attachment structures (48*a*, 48*b*).

13. A method of assembly for at least one component (20) with first attachment structures (28*a*, 28*b*), the component being arranged on or in at least one tube portion (2, 4) of a telescopic tube (1) having second attachment structures (48*a*, 48*b*) on an inner tube or on an outer tube of the telescopic tube, wherein the telescopic tube has a longitudinal axis (L), the method comprising the following steps:
 a) inserting the component (20) to the tube portion (2, 4) translatorily with respect to the longitudinal axis (L) while the tube portion (2, 4) is in a tilted state (T1) with respect to the longitudinal axis;
 b) aligning the component and inserting the first attachment structures (28*a*, 28*b*) of the component (20) in the second attachment structures (48*a*, 48*b*) of the tube portion (2, 4, R2 and T3);
 c) inserting at least one plug-in element (50, 60, 70) having third attachment structures (58, 68, 78) into the second attachment structures (48*a*, 48*b*) of the tube portion, wherein the third attachment structures (58, 68, 78) cooperate with the first attachment structures (28*a*, 28*b*) and second attachment structures (48*a*, 48*b*) to form-lockingly fix the component (20); and
 d) connecting the plug-in element (50, 60, 70) and the tube portion (2, 3) by at least one of a force-locking connection and a materially bonding connection.

14. The method according to claim 13, wherein the plug-in element (50, 60, and 70) is inserted from the outside of the tube (2, 4).

15. The method according to claim 13, wherein the plug-in element (50, 60, and 70) is inserted from the inside of the tube (2, 4).

16. The method according to claim 13, wherein the at least one component (20) is moved perpendicularly to the longitudinal axis (L) (T4) between steps b) and c).

17. The method according to claim 13, wherein in step b), initially a first of two of the first attachment structures (28*a*, 28*b*) of the component (20) is inserted into a first of the second attachment structures (48*a*, 48*b*) of the tube (2, 4), that the component (20) is aligned perpendicularly to the longitudinal axis (L), and that the component (20) is inserted into a further second attachment structure (48*a*, 48*b*) perpendicularly to the longitudinal axis (L) with a second of the two of the first attachment structures (28*a*, 28*b*).

* * * * *